United States Patent
Stratford

(10) Patent No.: US 7,961,689 B2
(45) Date of Patent: Jun. 14, 2011

(54) METHOD AND APPARATUS FOR DETERMINING AN END OF A SUBFRAME IN A TDD SYSTEM

(75) Inventor: Scott Stratford, Campbell, CA (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 268 days.

(21) Appl. No.: 12/208,971

(22) Filed: Sep. 11, 2008

(65) Prior Publication Data

US 2010/0041341 A1     Feb. 18, 2010

Related U.S. Application Data

(60) Provisional application No. 61/089,613, filed on Aug. 18, 2008.

(51) Int. Cl.
   *H04B 7/212* (2006.01)
(52) U.S. Cl. ...................................... 370/337
(58) Field of Classification Search .......... 370/328–339, 370/276–280
   See application file for complete search history.

(56) References Cited

U.S. PATENT DOCUMENTS

| | | | |
|---|---|---|---|
| 4,183,054 A | 1/1980 | Patisaul et al. | |
| 4,611,323 A | 9/1986 | Hessenmiiller | |
| 4,628,501 A | 12/1986 | Loscoe | |
| 4,654,843 A | 3/1987 | Roza et al. | |
| 4,691,292 A | 9/1987 | Rothweiler | |
| 4,999,831 A | 3/1991 | Grace | |
| 5,193,109 A | 3/1993 | Chien-Yeh Lee | |
| 5,243,598 A | 9/1993 | Lee | |
| 5,321,849 A | 6/1994 | Lemson | |
| 5,339,184 A | 8/1994 | Tang | |
| 5,867,292 A | 2/1999 | Crimmins et al. | |
| 6,205,133 B1 | 3/2001 | Bexten | |
| 6,801,767 B1 | 10/2004 | Schwartz | |
| 7,215,651 B2 | 5/2007 | Millar | |
| 7,250,830 B2 | 7/2007 | Layne et al. | |
| 2005/0041605 A1* | 2/2005 | Benson | 370/280 |
| 2006/0087980 A1 | 4/2006 | Ikeda | |
| 2006/0178162 A1 | 8/2006 | Utakouji et al. | |

(Continued)

FOREIGN PATENT DOCUMENTS

EP    0391597    10/1990

(Continued)

OTHER PUBLICATIONS

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

(Continued)

*Primary Examiner* — Frank Duong
(74) *Attorney, Agent, or Firm* — Fogg & Powers LLC

(57) ABSTRACT

A method for determining an end of a first period in which signals are communicated in a first direction is provided. The method comprises sampling a signal for a period of time up to at least as long as the longest expected length of the first period to obtain a sampled signal. The sampled signal is integrated to obtain an integrated power curve. A reference line is subtracted from the integrated power curve to obtain a rotated power curve. A peak in the rotated power curve is selected as an end of the first period.

27 Claims, 7 Drawing Sheets

U.S. PATENT DOCUMENTS

| | | |
|---|---|---|
| 2007/0201402 A1 | 8/2007 | Cho et al. |
| 2007/0230590 A1 | 10/2007 | Choi |
| 2007/0230592 A1 | 10/2007 | Choi |
| 2007/0254692 A1 | 11/2007 | McCoy |
| 2008/0212658 A1 | 9/2008 | Rofougaran |
| 2009/0122731 A1 | 5/2009 | Montojo |
| 2009/0185632 A1 | 7/2009 | Cai |
| 2009/0296609 A1 | 12/2009 | Choi |
| 2009/0316608 A1 | 12/2009 | Singh et al. |
| 2009/0316609 A1 | 12/2009 | Singh |
| 2009/0316611 A1 | 12/2009 | Stratford et al. |
| 2009/0318089 A1 | 12/2009 | Stratford et al. |

FOREIGN PATENT DOCUMENTS

| | | |
|---|---|---|
| KR | 1020050123504 | 12/2005 |
| KR | 1020060005925 | 1/2006 |
| KR | 1020060036657 | 5/2006 |
| KR | 1020060057132 | 5/2006 |
| KR | 1020060061013 | 6/2006 |
| KR | 100621054 | 9/2006 |
| KR | 100690112 | 3/2007 |
| WO | 9115927 | 10/1991 |
| WO | 2007074949 | 7/2007 |

OTHER PUBLICATIONS

Harvey et al., "Cordless Communications Utilising Radio Over Fibre Techniques for the Local Loop", "IEEE International Conference on Communications", Jun. 1991, pp. 1171-1175, Publisher: IEEE.

International Searching Authority, "International Search Report", Apr. 12, 2010, Published in: WO.

U.S. Appl. No. 12/144,913 "System and Method for Configurable Time-Division Duplex Interface", Inventors: Singh et al. Filing Date: Jun. 24, 2008.

U.S. Appl. No. 12/144,939 "System and Method for Synchronized Time-Division Duplex Signal Switching", Inventors: Singh et al Filing Date: Jun. 24, 2008.

U.S. Appl. No. 12/144,961 "Method and Apparatus for Frame Detection in a Communication System", Inventors: Stratford et al. Filing Date: Jun. 24, 2008.

U.S. Appl. No. 12/144,977 "Method and Apparatus for Switching in a TDD System", Inventors: Stratford et al. Filing Date: Jun. 24, 2008.

* cited by examiner

METHOD AND APPARATUS FOR DETERMINING AN END OF A SUBFRAME IN A TDD SYSTEM

The present application hereby claims priority, under 35 U.S.C. §119(e), to U.S. Provisional Patent Application No. 61/089,613 entitled "METHOD AND APPARATUS FOR DETERMINING AN END OF A SUBFRAME IN A TDD SYSTEM", filed on Aug. 18, 2008. U.S. Provisional Application No. 61/089,613 is hereby incorporated herein by reference.

CROSS REFERENCE TO RELATED APPLICATIONS

This application is related to the following applications, which are hereby incorporated herein by reference:

U.S. patent application Ser. No. 12/144,961, entitled "METHOD AND APPARATUS FOR FRAME DETECTION IN A TDD SYSTEM," filed on Jun. 24, 2008;

U.S. patent application Ser. No. 12/144,939, entitled "SYSTEM AND METHOD FOR SYNCHRONIZED TIME-DIVISION DUPLEX SIGNAL SWITCHING," filed on Jun. 24, 2008; and U.S. patent application Ser. No. 12/144,913, entitled "SYSTEM AND METHOD FOR CONFIGURABLE TIME-DIVISION DUPLEX INTERFACE," filed on Jun. 24, 2008.

BACKGROUND

Time-division duplex (TDD) methods emulate full duplex communication over a half duplex communication link. In particular, signals that are communicated from a first device to a second device occur on the same frequencies as, but at a different time than signals communicated from the second device to the first device. Typically, one direction of communication is referred to as the "downlink" direction (and the corresponding signals are referred to here as "downlink signals" or "downlink communications"), and the other direction of communication is referred to as the "uplink" direction (and the corresponding signals are referred to here as "uplink signals" or "uplink communications"). For example, in some systems, separate downlink and uplink timeslots or sub-frames are assigned.

Many systems use TDD for communication. For example, some implementations of the Institute of Electrical and Electronics Engineers (IEEE) 802.16 standard use TDD for communication of wireless radio frequency signals. For example, the Worldwide Interoperability for Microwave Access (WIMAX) Forum has promulgated implementation profiles based on IEEE 802.16 that use TDD. In one such WIMAX profile, the amount of time assigned to communications in each direction is dynamically allocated. In other words, as the amount of uplink data increases more bandwidth in the form of a larger sub-frame is allocated to the uplink direction.

In order for successful communication between devices in a TDD system, the devices need to synchronize when they switch from communicating in the downlink direction to communicating in the uplink direction and when they switch from communicating in the uplink direction to communicating in the downlink direction. Otherwise, signals will be lost due to interference or missed because each device was not switched to the same signal direction. The IEEE 802.16 standard specifies the use of global positioning system (GPS) receivers to provide a precise time reference for synchronizing each device. Moreover, the IEEE 802.16 standard also contemplates that each device has the ability to demodulate and decode IEEE 802.16 frames and sub-frames in order to extract information indicating how long each of the downlink and uplink sub-frames will be. The extracted information is also used to determine when to switch communication directions.

In some applications, a distributed antenna system (DAS) is used to relay signals between a first device and a second device in a TDD application. For example, in one such distributed antenna system, downlink RF signals from the first device are received at a donor antenna located on the roof of a building are down converted to an intermediate frequency (IF) signal by a hub unit and distributed over transport cabling (for example, optical fiber, coaxial cable, CATV cable, twisted-pair cabling) to a remote antenna unit located within the building. The downlink signals are then communicated from the remote antenna unit to the second device. The downlink IF signals received at the remote antenna unit are up converted back to the original RF frequency and radiated from a remote antenna. Similarly, uplink RF signals received at the remote antenna are down converted by the remote antenna unit to IF signals and transported over transport cabling back to the hub unit. The uplink IF signals received at the hub unit are up converted back to the original RF frequency and radiated from the donor antenna. One example of such a distributed antenna system is described in U.S. Pat. No. 6,157,810.

However, such distributed antenna systems are often not suitable for use with TDD RF transmission schemes (such as TDD WIMAX implementations). For example, conventional distributed antenna systems are typically designed for use with frequency division duplexing (FDD) systems (such as Global System for Mobile communications (GSM) and code division multiple access (CDMA) cellular systems). Moreover, GPS receivers typically do not work (or do not work very well) inside of buildings. Furthermore, such distributed antenna systems typically do not demodulate and decode the RF signals that they distribute.

SUMMARY

The following summary is made by way of example and not by way of limitation. In one embodiment, a method for determining an end of a first period in which signals are communicated in a first direction is provided. The method comprises sampling a signal for a period of time up to at least as long as the longest expected length of the first period to obtain a sampled signal. The sampled signal is integrated to obtain an integrated power curve. A reference line is subtracted from the integrated power curve to obtain a rotated power curve. A peak in the rotated power curve is selected as an end of the first period.

DRAWINGS

In accordance with common practice, the various described features are not drawn to scale but are drawn to emphasize specific features relevant to the present disclosure.

DETAILED DESCRIPTION

Figure 1:
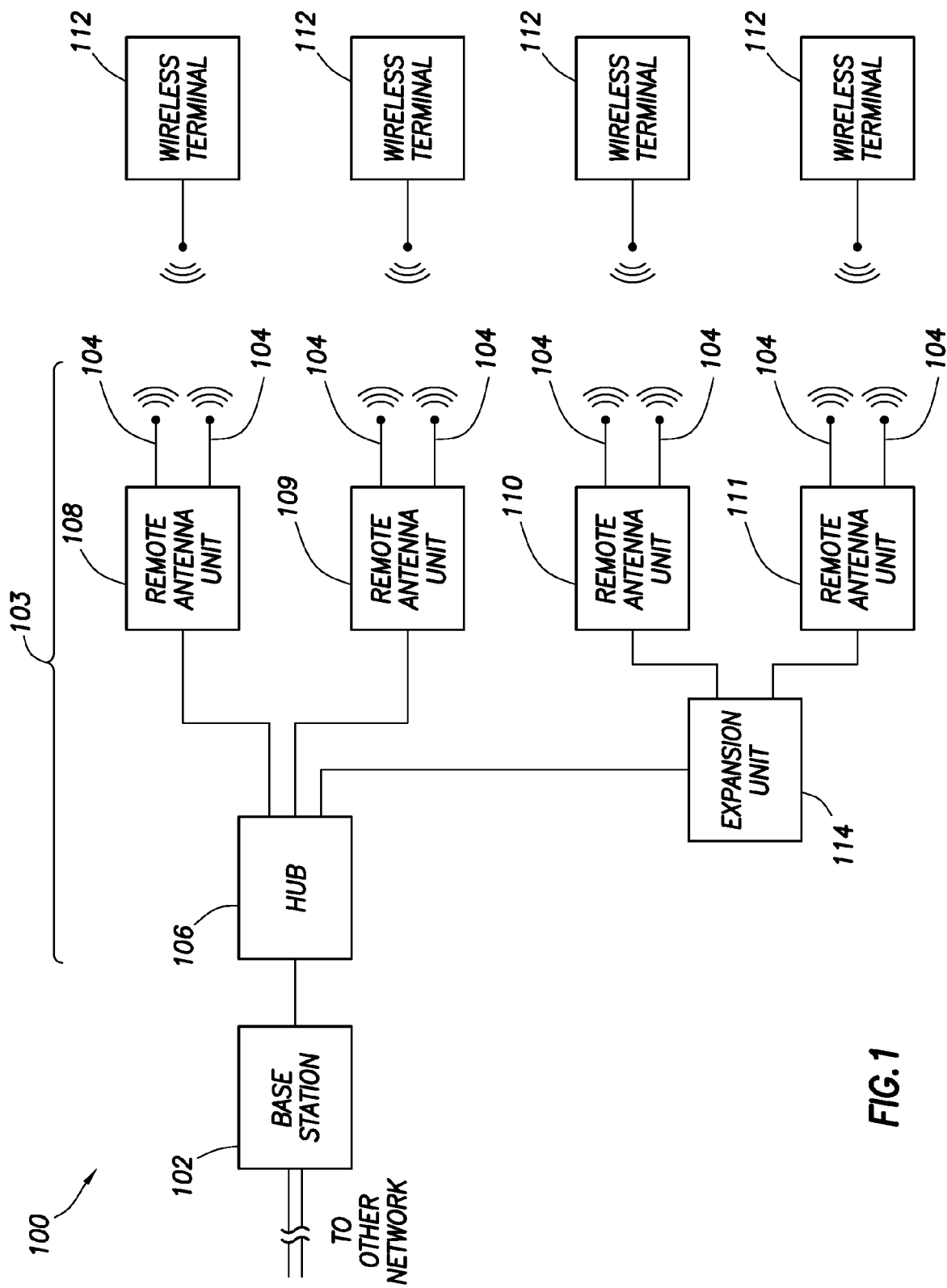
FIG. 1 is a block diagram of one embodiment of a communication system for switching between uplink and downlink transmissions.

FIG. 1 is a block diagram of one embodiment of a communication system 100. Communication system 100 is described here as being implemented in order to distribute TDD WiMAX RF signals. It is to be understood, however, that other embodiments can be implemented in other ways (for example, to distribute other types of TDD RF signals, such as Wireless Broadband, WiBro, or Long Term Evolution (LTE)). As mentioned in the Background section, TDD schemes enable bi-directional communication between two devices by having uplink transmissions (from wireless terminal 112 toward base station 102) and downlink transmissions (from base station 102 toward wireless terminal 112) occur at different times using the same frequencies.

In the embodiment shown in FIG. 1, communication system 100 comprises a base station 102 which is communicatively coupled to a distributed antenna system (DAS) 103. DAS 103 is used to transport radio frequency signals between one or more upstream devices (for example, base station transceiver 102, wireless access points, or other sources of radio frequency signals) and one or more downstream wireless devices (for example, wireless terminals 112). In some embodiments, base station transceiver 102 (also referred to herein as "base station" 102) is a part of a telecommunication-service providers' infrastructure and wireless terminals 112 comprise customer premise equipment. In general, for each radio frequency signal or channel over which base station 102 communicates with a downstream wireless terminal 112, an original downlink radio frequency signal is originally transmitted by base station 102 for reception by one or more wireless terminals 112 and an original uplink radio frequency signal is originally transmitted by a wireless terminal 112 for reception by base station 102.

DAS 103 comprises a hub 106 communicatively coupled to remote antenna units 108-109. In this embodiment, DAS 103 also includes an expansion unit 114 communicatively coupled between hub 106 and remote antenna units 110, 111 to expand the range of hub 106. Each remote antenna unit 108-111 is coupled to one or more antennas 104 which are used to communicate wirelessly with wireless terminals 112. In this embodiment, each of remote antenna units 108-111 is coupled to two antennas 104, a primary antenna and a diversity antenna. Although in this embodiment a certain number of remote antenna units 108-111 and expansion units 114 are coupled to hub 106, in other embodiments other numbers of remote antenna units 108-111 and expansion units 114 are coupled to hub 106.

In one embodiment, hub 106 is communicatively coupled to expansion unit 114 via one or more fiber optic cables. Remote antenna units 108-111 are communicatively coupled to hub 106 or expansion unit 114 through for example, thin coaxial cabling, CATV cabling, or fiber optic cabling, for example, where multiple RF frequency bands are distributed, or lower-bandwidth cabling, such as unshielded twisted-pair cabling, for example, where only a single RF frequency band is distributed.

Hub 106 is communicatively coupled to one or more upstream devices (such as one or more base stations 102 or wireless access points). In some embodiments, hub 106 is physically connected to the one or more upstream devices. In other embodiments, hub 106 is communicatively coupled to the one or more upstream devices in other ways (for example, using one or more donor antennas and one or more bi-directional amplifiers or repeaters). In this embodiment, base station 102 comprises a WiMAX base station.

DAS 103 distributes communication between wireless terminals 112 and base station 102. Wireless terminals 112 transmit/receive signals to/from remote antenna units 108-111 via remote antennas 104. In the particular WiMAX embodiment shown in FIG. 1, base station 102 transmits original downlink RF signals which are supplied to hub 106. The original downlink RF signals are down converted to IF frequency bands. The downlink IF signals are then distributed to remote antenna units 108-111.

The downlink IF signals are distributed to remote antenna units 108-111 either directly (as shown for remote antenna units 108 and 109 in FIG. 1) or through an expansion hub (as shown for remote antenna units 110-111 in FIG. 1). Signals communicated to expansion unit 114 are sent over a fiber link using an analog optical modulator. Expansion unit 114 receives and demodulates the optical signal to recover the downlink IF signal, which is then transmitted to each of remote antenna units 110-111 that are coupled to that expansion unit 114. The downlink IF signal is sent directly to remote antenna units 108-109. Each remote antenna unit 108-111 receives the downlink IF signal from either expansion unit 114 or hub 106 and upconverts each such downlink IF signal to its original RF frequency as was received from base station 102 in order to reproduce each original downlink radio frequency signal. The reproduced downlink RF signal is radiated for reception by a suitable wireless device 112 (if any) that is located within the coverage area of the particular remote antenna unit 108-111.

A similar process is performed in the uplink direction. Each wireless device 112 transmits original uplink RF signals from one or more respective antennas. At each remote antenna unit 108-111, remote antennas 104 for that RAU 108-111 receive the original uplink RF signals. The received original uplink RF signals are filtered to remove out-of-band signals. Remote antenna units 108-111 downconvert each uplink RF channel to a different intermediate frequency (IF) for distribution back to hub 106. The downconverted uplink IF channels are combined (using FDM) and communicated to the upstream device communicatively coupled to remote antenna unit 108-111 (either hub 106 or expansion unit 114). Signals received at expansion unit 114 are communicated to hub 106 over a fiber link using an analog optical modulator. Signals from expansion unit 114 are received at hub 106, and hub 106 demodulates the optical signal from expansion unit 114 to recover the uplink IF signal transmitted from that expansion unit 114. The recovered uplink IF signals from expansion unit 106 are then combined with uplink IF signals from remote antenna units 108-109. Hub 106 then upconverts each uplink IF signal to its original RF frequency as was received over the air by remote antenna units 108-111 in order to reproduce each original uplink radio frequency signal. Each reproduced uplink RF channel is then communicated to base station 102.

In this embodiment, for both uplink and downlink communications, the components of DAS 103 (hub 106, expansion unit 114, and remote antenna units 108-111) do not demodulate, decode, or deframe the signals transmitted by base station 102 and wireless terminals 112. Instead DAS 103 acts as a repeater system, receiving and reproducing the signals between base station 102 and wireless devices 112.

Figure 2:
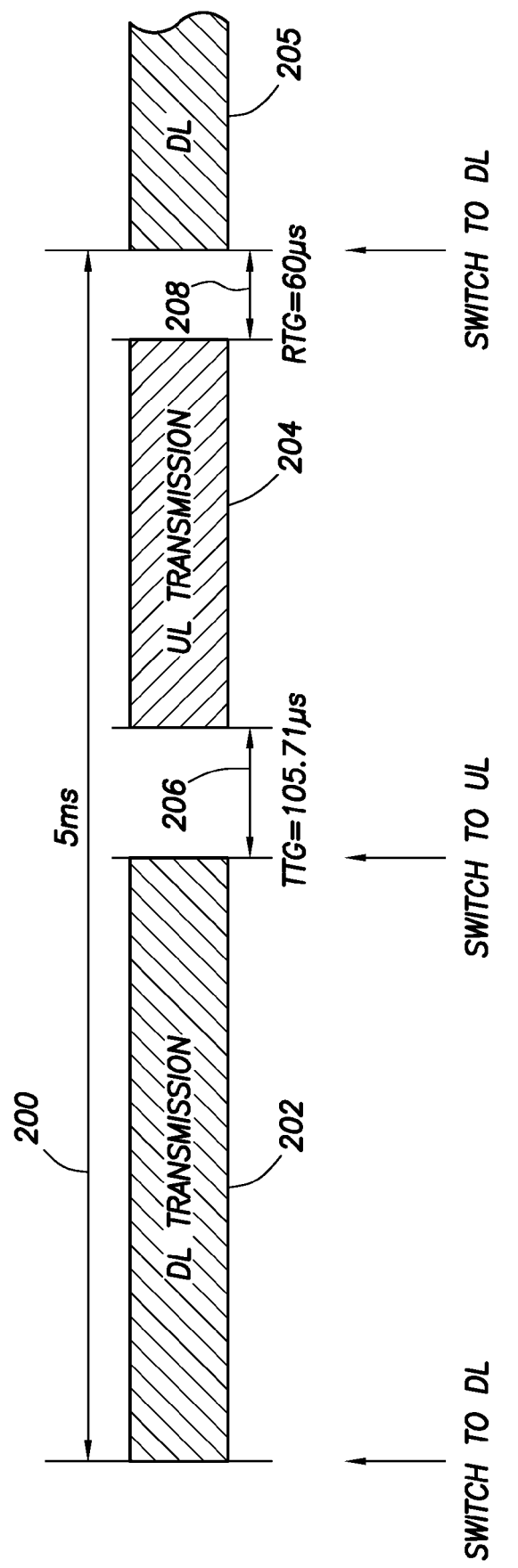
FIG. 2 is a diagram of one embodiment of a frame structure.

FIG. 2 illustrates one example of a TDD transmission frame 200 for use with system 100. Frame 200 comprises a downlink (DL) subframe 202 followed by an uplink (UL) subframe 204. During each downlink subframe 202, downlink signals are communicated from base station 102 to wireless terminals 112. During each uplink subframe 204, uplink signals are communicated from wireless terminals 112 to base station 102. In addition, a portion of a second downlink subframe 205 of a subsequent TDD frame is also shown. Each start or end of a transmission is referred to herein as a transmission boundary.

In this embodiment, every TDD frame 200 has substantially the same format, having a 5 ms fixed duration and containing one downlink subframe followed by one uplink subframe. In some embodiments, a portion of TDD frame 200 is allocated for control data. In other embodiments, TDD frame 200 may have a variable duration, and/or multiple uplink or downlink subframes may be included within each frame 200. Additionally, other embodiments may have an uplink subframe first which is followed by a downlink subframe, or a variation across frames between uplink and downlink subframes starting each frame.

In the embodiment shown in FIG. 2, the beginning portion of TDD frame 200 is allocated to downlink subframe 202. At the end of the downlink subframe 202, a time gap (TTG) 206 occurs before the start of uplink subframe 204. Then, uplink subframe 204 begins, and another time gap (RTG) 208 occurs between the end of uplink subframe 204 and the beginning of the subsequent downlink subframe 205 of the next frame. TTG 206 between downlink subframe 202 and uplink subframe 204 allows time for base station 102 to switch from transmit to receive mode and for each wireless terminal 112 to switch from receive to transmit mode. Likewise, RTG 208 allows time for base station 102 to switch from receive to transmit mode and wireless terminals 112 to switch from transmit to receive mode. As used here, "transmit mode" means the device is sending outgoing communications, and "receive mode" means the device is receiving incoming communications. TTG 206 and RTG 208 also provide time for such things as base station/mobile synchronization and propagation delay determination/adjustment.

The RF circuitry within DAS 103 also switches between processing downlink transmissions and uplink transmissions. Similar to base station 102 and wireless terminals 112, the switching of the RF circuitry within DAS 103 occurs during time gaps TTG 206 and RTG 208. The RF circuitry within hub 106 as well as RF circuitry within each remote antenna unit 108-111 performs the uplink and downlink switching.

In one embodiment, each frame 200 has the same duty cycle, such that the duration of downlink subframe 202 and uplink subframe 204 are fixed. In an alternative embodiment, the duty cycle is variable such that the duration of downlink subframe 202 and uplink subframe 204 are variable on a frame-by-frame basis. For a variable duty cycle, the subframe durations are dynamically assigned during transmission based on system traffic, user preferences, or other parameters. For example, in one embodiment, frame 200 has 47 total frames and has predetermined downlink subframe lengths of 35, 34, and 33 symbols, and uplink subframe lengths of 12, 13, and 14 symbols as allowed by the communications protocol. A 35 symbol downlink subframe 202 corresponds to a 12 symbol uplink subframe 204. Regardless of the number of symbols in each subframe, the total number of uplink and downlink symbols remains at 47. Thus, if there are fewer symbols in a downlink subframe 202, there will be more symbols in the corresponding uplink subframe 204. In this embodiment, regardless of whether frames 200 are fixed or variable duty cycles, the time periods for TTG 206 and RTG 208 have a fixed duration. Although in this embodiment, the particular TDD structure in FIG. 2 is used, other embodiments are implemented using other TDD schemes.

Wireless terminals 112 obtain the timing of downlink subframe 202 and uplink subframe 204 from communications sent by base station 102. In one embodiment, these communications occur on a separate control channel and wireless terminals 112 listen to the control channel to obtain the frame and subframe timing. In another embodiment, wireless terminals 112 obtain the frame and subframe timing from messages sent by base station 102 within frame 200 or by listening to current transmissions on the payload channel and ascertaining the timing directly from the transmissions. In any case, wireless terminals 112 determine at what time of each frame 200 begins, when downlink subframe 202 will end, when to switch from receiving mode to transmitting mode, and at what point to start transmitting uplink subframe 204. In this embodiment, however, hub 106 and remote antenna units 108-111 do not have the circuitry required to demodulate and unpack signals transmitted between base station 102 and wireless terminals 112. Thus, in one embodiment, hub 106 and remote antenna units 108-111 have circuitry included for independently determining the timing of the frames and subframes.

Figure 3:
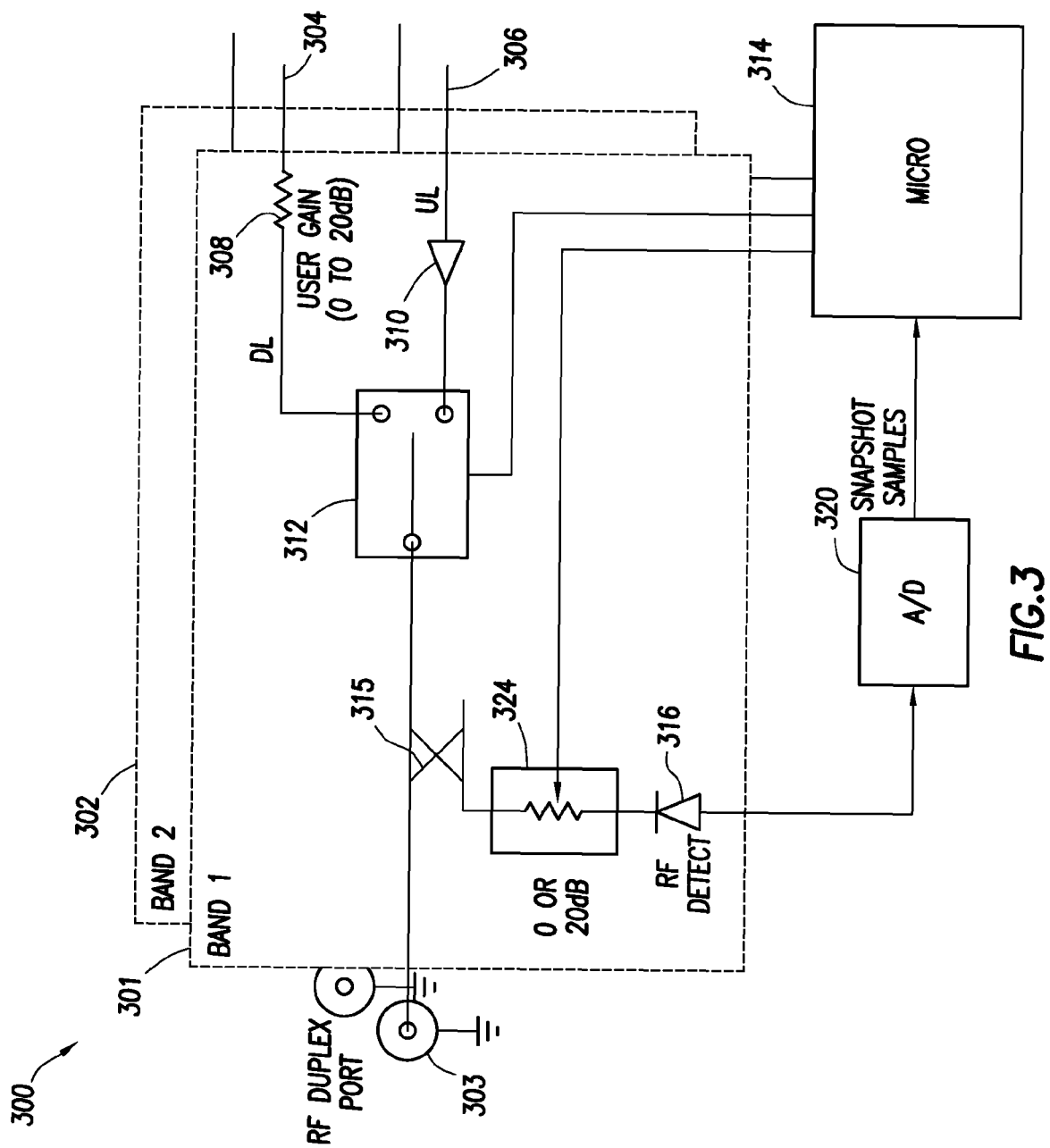
FIG. 3 is a block diagram of one embodiment of a communications circuit for switching between uplink and downlink transmissions.

FIG. 3 illustrates one embodiment of a circuit 300 for determining the location in time of a boundary of a transmission structure in communications system 100. In the embodiment shown in FIG. 3, circuit 300 determines the location in time of an end of a subframe based on the power level of signals that are transmitted within system 100. Based on the determined subframe timing, circuit 300 determines when to switch between a TDD downlink mode and a TDD uplink mode. For example, in this embodiment, circuit 300 determines the location in time of the ending boundary for downlink subframe 202.

Circuit 300 detects signals currently being transmitted on system 100 (for example, between base station 102 and other wireless terminals not shown) and determines an end boundary of a downlink subframe. The determined timing of the downlink subframe is then used to determine a duty cycle of the frames and thus, when circuit 300 switches from downlink to uplink mode. When the frame duty cycle is fixed, the end of downlink subframe 202, and thus the start of uplink subframe 204 is fixed relative to start of frame 200. If the location in time of the start of a frame is known by, for example, using the process described in co-pending U.S. patent application Ser. No. 12/144,961, entitled "METHOD AND APPARATUS FOR FRAME DETECTION IN A TDD SYSTEM," filed on Jun. 24, 2008, the end of the downlink subframe 202 is used to determine the length of downlink subframe 202. From this length the length of uplink subframe 204 and the duty cycle of frame 200 are determined. Once the duty cycle of frame 200 and the start time of frame 200 are known, switching can take place automatically at predetermined times.

In one embodiment, both hub 106 and remote antenna units 108-111 comprise circuits such as circuit 300 to determine when to switch between TDD uplink mode and TDD downlink mode. In an alternative embodiment, circuit 300 is included only within hub 106. In such an embodiment, hub 106 determines the switching times for itself, as well as remote antenna units 108-111, and forwards control signals indicating the time for switching to remote antenna units 108-111 as described in co-pending U.S. patent application Ser. No. 12/144,939, entitled "SYSTEM AND METHOD FOR SYNCHRONIZED TIME-DIVISION DUPLEX SIGNAL SWITCHING," filed on Jun. 24, 2008, which is hereby incorporated herein by reference.

In the embodiment shown in FIG. 3, circuit 300 processes the signals of two frequency bands. Circuit 301 processes signals of a first frequency band and circuit 302 processes signals of a second frequency band. In this embodiment, circuit 301 and 302 are similar, with the exception of minor differences to enable each circuit 301, 302 to support its respective frequencies. Thus, only circuit 301 is described in detail. In other embodiments, only one frequency band is supported. In still other embodiments, more than two frequency bands are supported.

On circuit 301 signals are transmitted and received to/from base station 102 at RF duplex port 303. RF duplex port 303 is one example of an interface for circuit 301 to a communication medium. Signals to/from wireless terminals 112 are output and received at downlink (DL) port 304 and uplink (UL) port 306, respectively. Downlink port 304 and uplink port 306 are also examples of interfaces for circuit 301 to a communication medium. Downlink port 304 and uplink port 306 are coupled to one or more antennas 104, from and at which wireless signals are radiated to and received from wireless terminals 112. A variable resistor 308 controls the power of downlink signals output from downlink port 304. On the uplink side, an amplifier 310 amplifies signals received from wireless terminals 112 for further processing and outputting to base station 102.

Circuit 301 is operable to switch between outputting signals to a communication medium on RF duplex port 303 to receiving signals from the communication medium on RF duplex port. In one embodiment, a switch 312 switches circuit 301. Switch 301 switches circuit 300 between uplink mode and downlink mode by coupling RF duplex port 303 to either downlink port 304 (to receive signals from the communication medium coupled to RF duplex port 303) or uplink port 306 (to output signals to the communication medium coupled to RF duplex port 303). In the embodiment shown in FIG. 3, switch 312 is a single pole, double throw switch having one common connection (coupled to duplex port 303) and two switched connections (coupled to downlink port 304 and uplink port 306 respectively). In an alternative embodiment, port 303 comprises two simplex ports which operate as a duplex port. More detail regarding the configuration of circuit 300 and port 303 as simplex or duplex is provided in co-pending U.S. patent application Ser. No. 12/144,913, entitled "SYSTEM AND METHOD FOR CONFIGURABLE TIME-DIVISION DUPLEX INTERFACE," filed on Jun. 24, 2008, which is hereby incorporated herein by reference.

Figure 4:
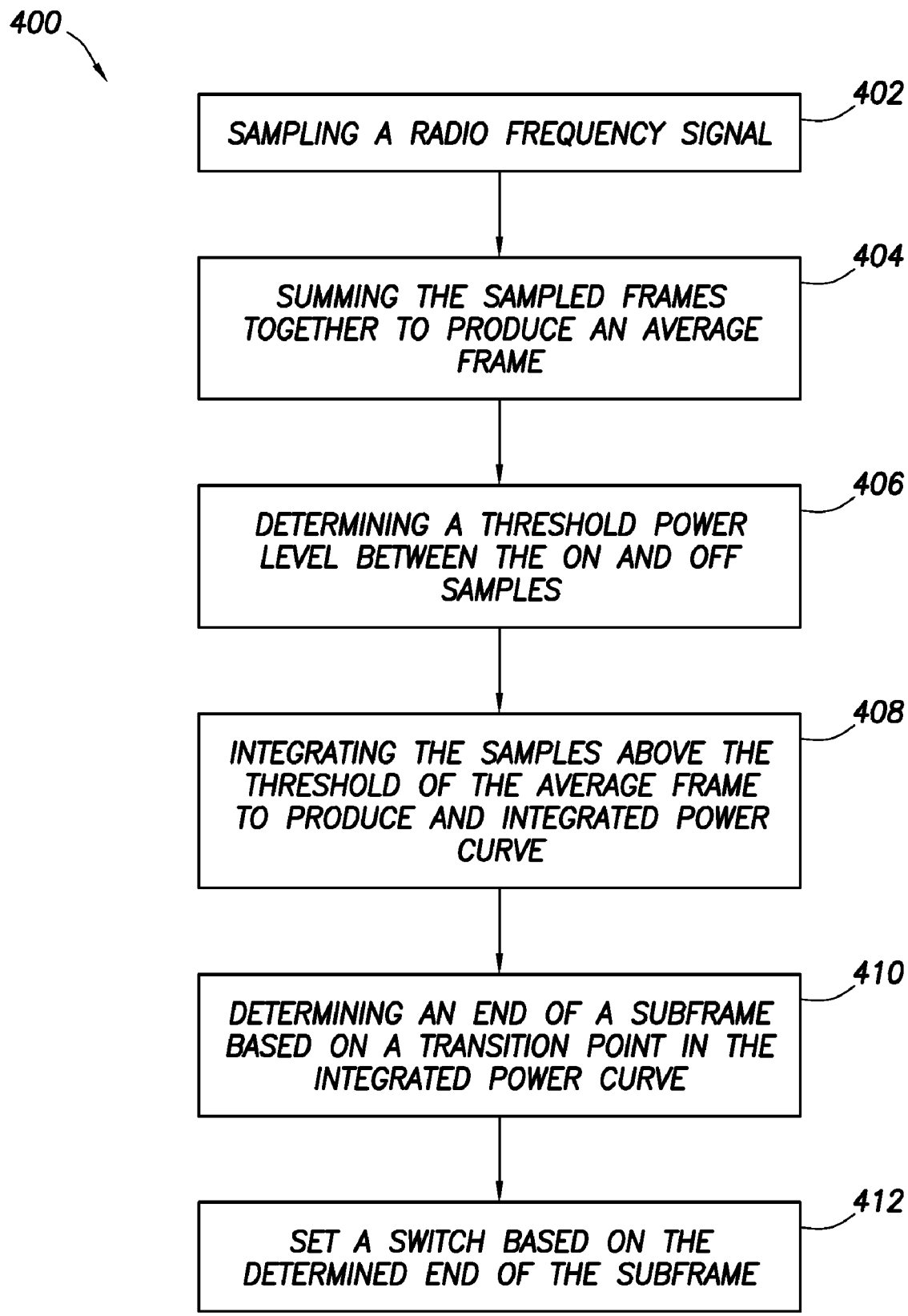
FIG. 4 is a flow chart illustrating one embodiment of a method of determining an end of a subframe.

Referring now to FIG. 4, one embodiment of a method 400 for determining when to switch between operating in a TDD downstream mode and a TDD upstream mode in accordance with a TDD scheme. The particular embodiment of method 400 shown in FIG. 4 is used for determining the timing of an end of a period of time in which signals are communicated in a first direction. For example, method 400 determines then end of a downlink subframe 202. Downlink subframe 202 is one example of a period of time in which signals are communicated in a first direction. Uplink subframe 204 is another example. The following discussion relates to determining the timing of downlink subframe 202, however, it should be understood that the methods and apparatus described herein could also be used with appropriate adjustments and modifications to determine the timing of uplink subframe 204. Moreover, the particular embodiment of method 400 shown in FIG. 4 is described here as being implemented using the circuit 300 of FIG. 3 and the system 100 of FIG. 1. However, other embodiments of method 400 are implemented in other ways.

Method 400 begins at block 402 where information indicative of the power level of a downlink signal generated. In one embodiment, such informative is generated by detecting and sampling a power level of a downlink signal. Downlink signals are received at RF duplex port 303 and a coupler 315 couples the downlink signal to an RF detector 316. In this embodiment, coupler 315 is located upstream of switch 312. Additionally, in this embodiment, RF detector 316 is a root-mean-squared (RMS) detector. Prior to the downlink signal reaching RF detector 316, the signal is attenuated by attenuator 324 if necessary. More detail regarding attenuator 324 is provided below. RF detector 316 outputs a power level signal that is indicative of the power of the downlink signal, and an analog to digital (A/D) converter 320 outputs digital samples of the power level signal output by RF detector 316. That is, A/D converter 320 converts the power level signal output by RF detector 316 into digitized samples ("snapshot samples") for microprocessor 314. Microprocessor 314 records the time in which each sample was collected and collects samples for a period of time such that at least one downlink subframe 202 is sampled. During detection of the at least one downlink subframe 202, switch 312 is set to the downlink position such that uplink subframes are not coupled into RF detector 316. In one embodiment, the samples are collected for a period of time equal to one frame period. In another embodiment, multiple successive frames are detected and sampled.

Figure 5:
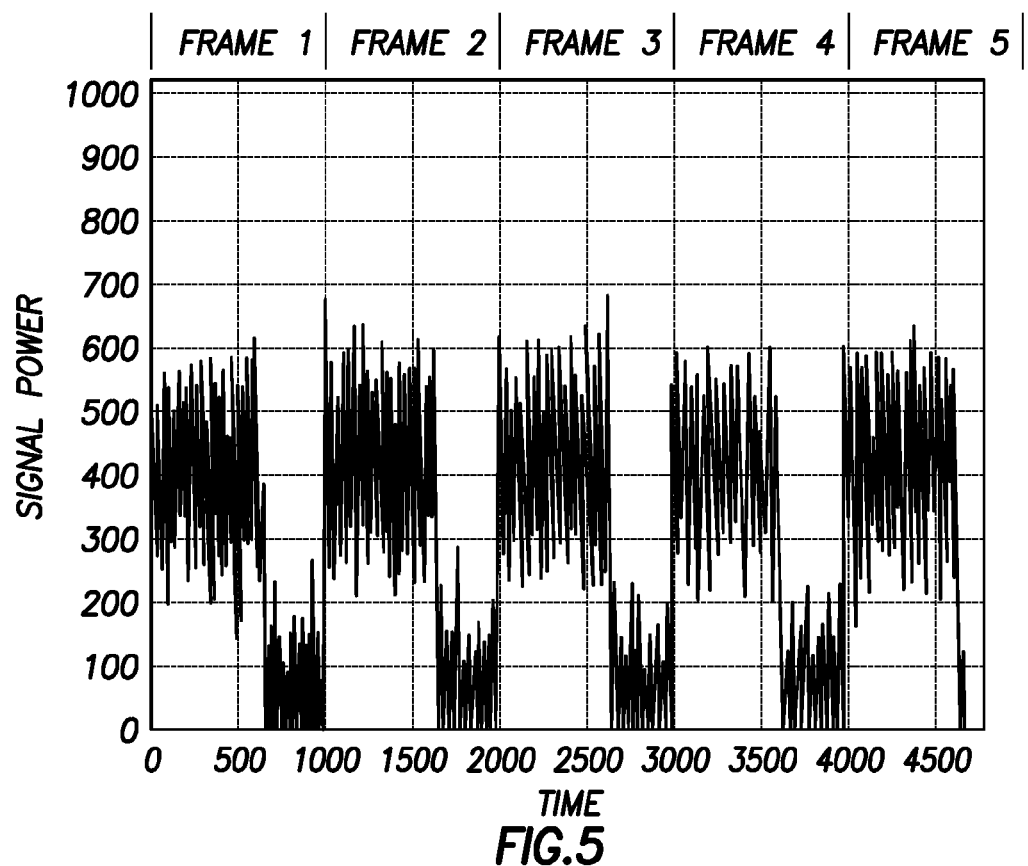
FIG. 5 is a graph illustrating one embodiment of multiple sampled frames.
Figure 6:
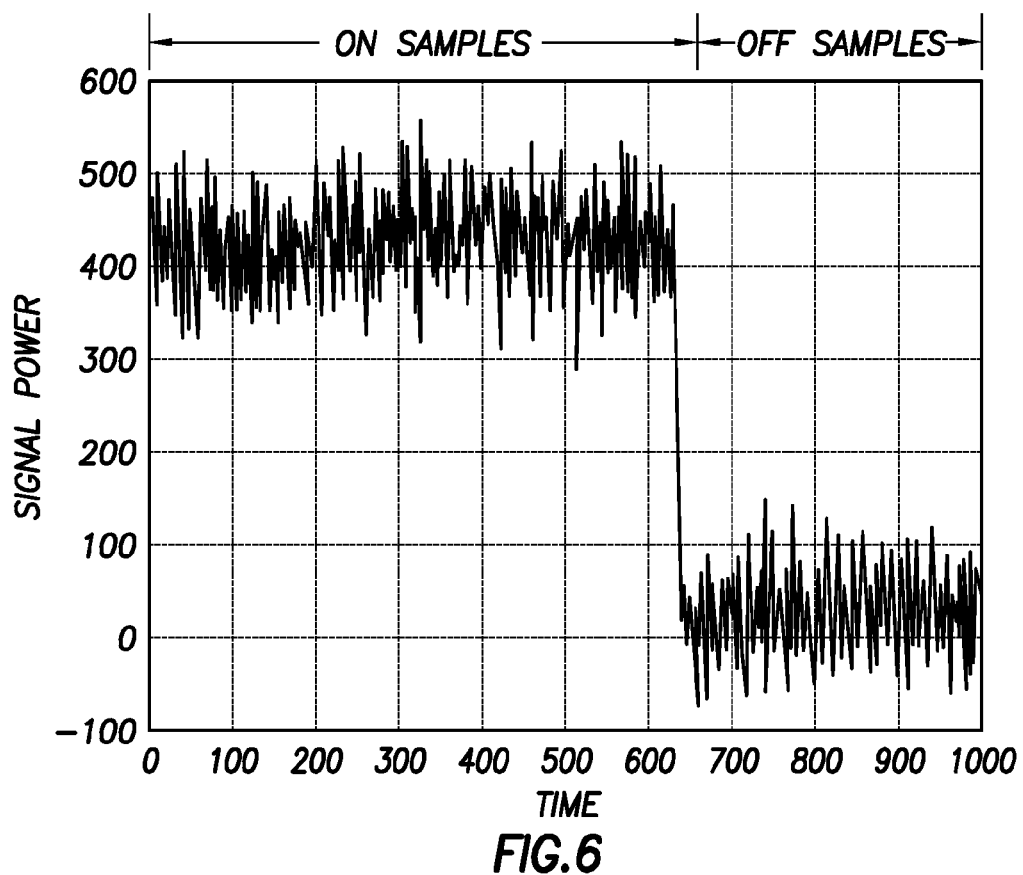
FIG. 6 is a graph illustrating one embodiment of a single sampled average frame.

At block 404, when multiple frames are detected and sampled at block 404, the sampled frames are coherently added to create a single "average" frame. As used herein "coherently added" means the frames are aligned and then added. In the embodiment shown and described below five frames are coherently added. In other embodiments, other numbers of frames are coherently added. First, as mentioned above, the downlink subframe is detected and sampled. FIG. 5 shows an example of five detected and sampled frames. As mentioned above, only the downlink portion of the frames is detected and sampled, thus the first portion of each of the frames has a higher power level than the second portion of the frames. Samples taken during the time period while a downlink subframe is being transmitted are referred to herein as "ON" samples. The second portion of each frame has a lower power level representing noise received as no valid data is received. Samples taken during this time period while a downlink subframe is not being transmitted are referred to herein as "OFF" samples. The five frames are added together by aligning the first sample of each frame and summing the frames. The result is a single average frame as shown in FIG. 6. In embodiments where only a single frame is detected, block 404 is not needed and the method proceeds directly from block 402 to block 406 using the single frame as the average frame.

In one embodiment, at block 406, a threshold power level is determined in order to improve processing of the average frame. The threshold power level is set between the ON and OFF sample power levels, and is used to differentiate between ON and OFF samples. In one embodiment, ON samples are processed, and OFF samples are ignored, since OFF samples represent noise. In an alternative embodiment, both ON and OFF samples are processed.

Figure 7:
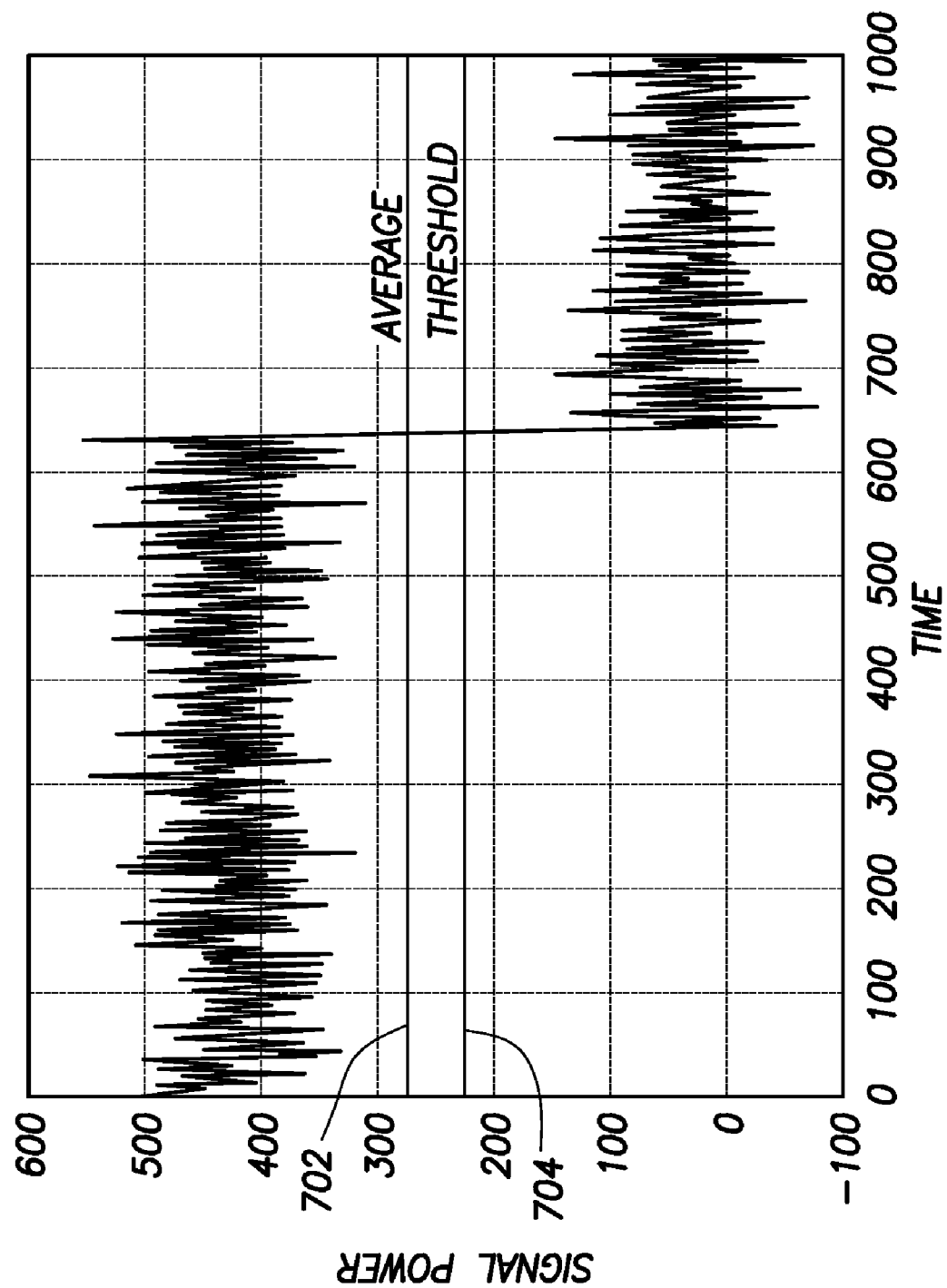
FIG. 7 is a graph illustrating the single sampled average frame of FIG. 6 with one embodiment of a simple average power level and a threshold power level.

In one embodiment, to determine a threshold, a simple power average is computed from all the samples in the average frame. The simple power average is the sum of all the samples of the average frame divided by the number of samples. The simple power average line is shown in FIG. 7 as line 702. In one embodiment, the simple power average is scaled to move the threshold closer to the actual midpoint between the ON and OFF samples by taking into account differences in the length of downlink subframe 202 compared to uplink subframe 204. For example, when downlink subframe 202 is longer than uplink subframe 204, the simple power average computed based on the ON samples is higher than the actual midpoint between the ON and OFF samples, because there are a larger number of ON samples than OFF samples. One embodiment for scaling the simple power average uses information based on the expected range in length of downlink subframes. For example, certain WiMax systems implementation profiles have a maximum downlink subframe length of 35 symbols and a minimum downlink subframe length of 26 symbols. Based on these numbers, the length of a WiMax symbol (102.857 μs), and the length of a WiMax frame (5000 μs), a scale factor is determined according to the following equation:

$$\text{Scale Factor} = \left(\frac{35 + 26}{2}\right) \cdot \frac{102.857 \ \mu s}{5000 \ \mu s/\text{frame}} = 0.6274.$$

Thus, one scale factor for such WiMax implementation profiles is 0.6274. In this embodiment, that scale factor is then adjusted by the following equation:

Thresh=SimpleAve·[−0.6274×1.1+1.5].

The 1.1 and 1.5 numbers to adjust the scale factor are determined from empirical data and are in the form of an equation of a straight line. The empirical data is related to the number of bits in the samples and the noise floor of detector 316 which is measured and fit to a line. The simple average power is then multiplied by the scale factor to determine the threshold. The threshold is shown by line 704 in FIG. 7.

In other embodiments, other scale factors are used to adjust the simple power average. In yet another embodiment, no scale factor at all is applied to the simple power average. In still other embodiments, the threshold is determined using different methods.

Figure 8:
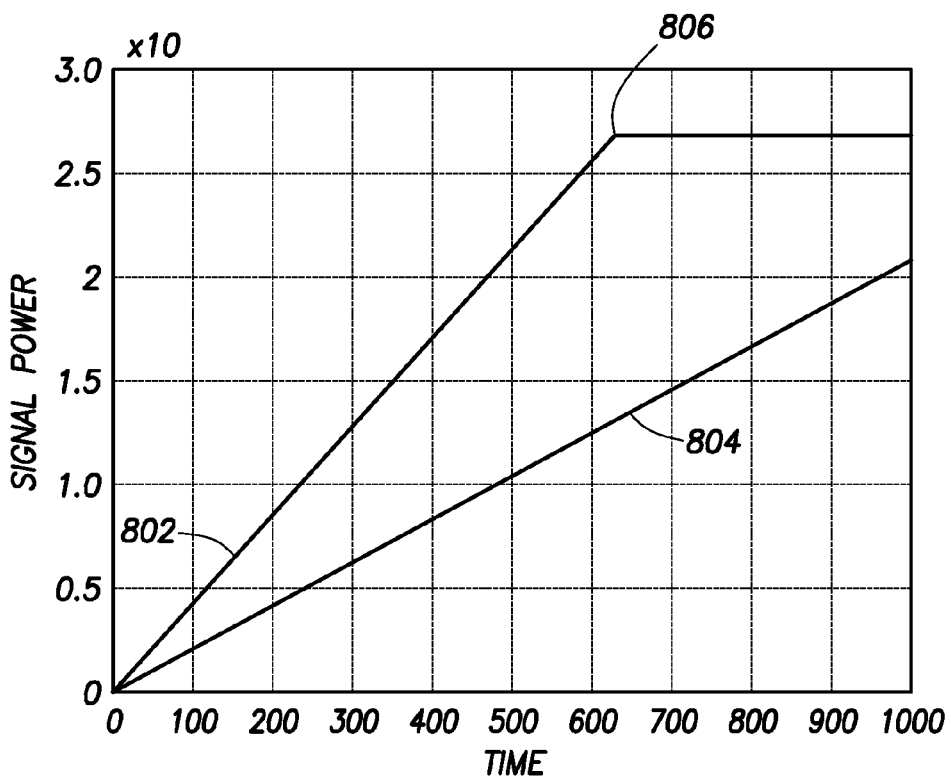
FIG. 8 is a graph illustrating one embodiment of an integrated power curve.

At block 408, the samples for the average frame are cumulatively summed to form an integrated power curve. As used herein cumulatively summed refers to adding each value for each point to the previous sum and progressing to the next point. For example, if the first three points are 1, 2, 3, cumulatively summing the points would result in a curve having a first point of 1, a second point of 3 (1+2), and a third point of 6 (3+3). In one embodiment, all samples above the threshold of block 406 (the ON samples) are integrated and all samples below the threshold (the OFF samples) are ignored. This results in curve 802 shown in FIG. 8. Curve 802 ramps up while the ON samples are added and at the end of the ON samples curve 802 levels out. In an alternative embodiment, the threshold of block 406 is not used and the resulting integrated power curve ramps up while the ON samples are added, and then ramps up at a much slower rate while the OFF samples are added.

At block 410, the end of downlink subframe 202 is determined by microprocessor 314 from the integrated power curve. The end of downlink subframe 202 is identified as the transition point between the ON samples and the OFF samples. For example, in FIG. 8, the transition point is shown by 806.

Figure 9:
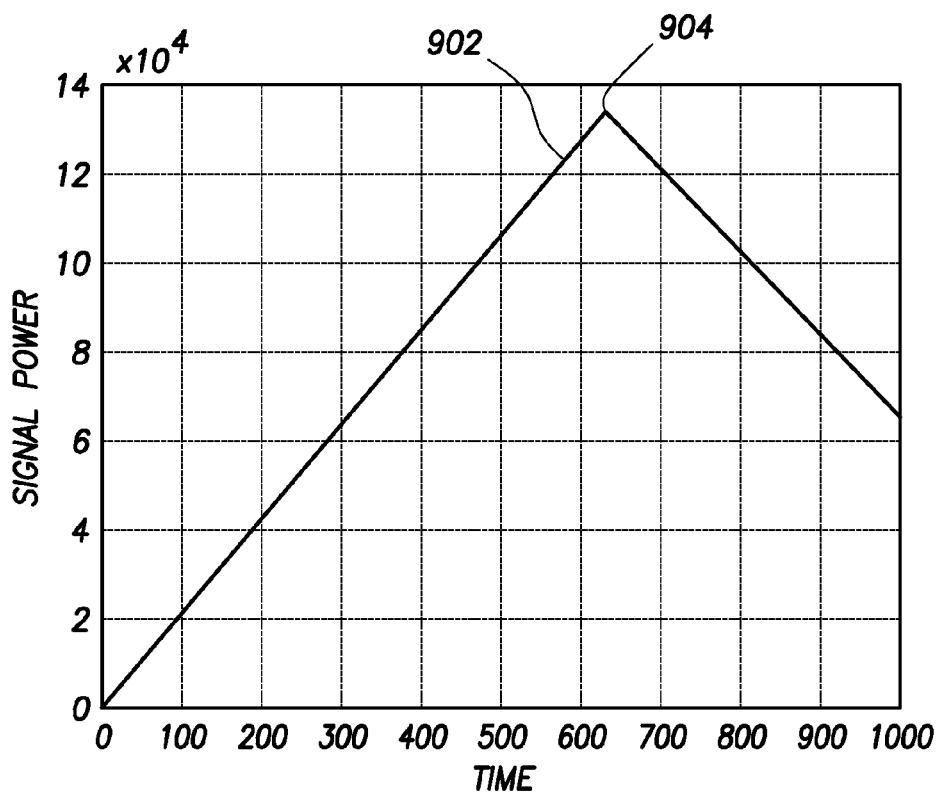
FIG. 9 is a graph illustrating one embodiment of a rotated power curve.

In one embodiment, to aid in determining the transition point between ON and OFF samples, the integrated power curve is rotated downward by subtracting a straight line 804 is from the integrated power curve. The downward rotated power curve results in a peak at the transition point between the ON and OFF samples. FIG. 9 shows an example of a rotated power curve 902 which is line 804 subtracted form curve 802. Peak detection is then performed on rotated power curve 902. The peak 904 as shown in FIG. 9 corresponds to transition point 806 of FIG. 8. The sample at which peak 904 is located is then divided by the total number of samples in the average frame to determine the ratio of the ON samples to the OFF samples. This is also the ratio of the sampled downlink subframe to the rest of the frame. Accordingly, the length of downlink subframe 202 and the frame duty cycle can then be determined.

In one embodiment, there is a finite number of expected downlink subframe lengths, and the determined downlink subframe length is rounded to the nearest possible downlink subframe length.

In one embodiment, the threshold value determined at block 406 is used to make straight line 804. Straight line 804 is half of the threshold value from block 406 cumulatively summed over time. For example, straight line 804 has a first point equal to half of the threshold value. As straight line 804 travels along the graph, half the threshold value is added to itself at each point in line 804. Thus, the second point of line 804 equals one of threshold value, the third point one and one half and so on. Advantageously, subtracting straight line 804 comprising a slope of cumulatively summed threshold values results in a balanced rotated curve 902 which may reduce errors in peak detection.

At block 412, microprocessor 314 uses the information obtained in step 410 to set switch 312 to uplink mode (coupling signals from uplink port 306 to RF duplex port 303) for subsequent uplink subframes 204. Once microprocessor 314 determines the length of downlink subframe 202 and/or the duty cycle of frame 200, this information is used to set switch 312 to uplink mode at the end of downlink subframe 202. When the duty cycle is fixed, the end time of subsequent downlink subframes can be predicted based on the determined length of downlink subframe 202, because the end of each downlink subframe is the same amount of time from the start of each frame. Thus, in one embodiment, switch 312 is set to switch to uplink mode at the same point in time for every frame.

Referring back to FIG. 3, in one embodiment, prior to the downlink signal reaching RF detector 316 and A/D converter 320, the signal is attenuated, if needed, by an attenuator 324. More detail regarding attenuator 324 is provided in co-pending application U.S. patent application Ser. No. 12/144,961, entitled "METHOD AND APPARATUS FOR FRAME DETECTION IN A TDD SYSTEM," filed on Jun. 24, 2008, which is hereby incorporated herein by reference.

Although specific embodiments have been illustrated and described herein, it will be appreciated by those of ordinary skill in the art that any arrangement, which is calculated to achieve the same purpose, may be substituted for the specific embodiments shown. It is manifestly intended that any inventions be limited only by the claims and the equivalents thereof.

What is claimed is:

1. A method for determining an end of a first period in which signals are communicated in a first direction, the method comprising:

sampling a signal for a period of time up to at least as long as the longest expected length of the first period to obtain a sampled signal;

integrating the sampled signal in a processing device to obtain an integrated power curve;

subtracting a reference line from the integrated power curve in the processing device to obtain a rotated power curve;

selecting a peak in the rotated power curve as an end of the first period; and setting a switch based on the end of the first period.

2. The method of claim 1, wherein sampling a signal samples at least one downlink period.

3. The method of claim 1, wherein sampling a signal, samples a signal over a plurality of frames, the method further comprising:

adding the plurality of sampled frames by aligning a start of each of the plurality of sampled frames and summing the sampled frames to produce an average sampled frame;

wherein integrating, integrates the average sampled frame.

4. The method of claim 1, wherein sampling samples from the start of a frame to the end of a frame.

5. The method of claim 1, wherein integrating adds samples of the sampled signal above a threshold and ignores samples of the sampled signal below the threshold.

6. The method of claim 5, wherein the threshold is approximately a midpoint between ON and OFF samples of the sampled signal, wherein ON samples are samples obtained while a subframe is being received and OFF samples are samples obtained while a subframe is not being received.

7. The method of claim 1, wherein the reference line is half of a threshold value cumulatively added to itself, wherein the threshold value is approximately half of a midpoint between ON and OFF samples of the detected signal, wherein ON samples are sampled obtained while a subframe is being received and OFF samples are samples obtained while a subframe is not being received.

8. An apparatus for switching in a time division duplexing (TDD) system comprising:

a switch having a first port coupled to an uplink communication path and a second port coupled to a downlink communication path;

a power level detector to output a power level signal indicative of a power level of a signal representing a radio frequency signal propagating through the switch;

a processing device configured to cumulatively sum samples of the power level signal output by the power level detector to produce an summed power curve, wherein the processing device is configured to subtract a reference line from the summed power curve to obtain a rotated power curve, and wherein the processing device is configured to control the switch based on a time of a peak in the rotated power curve.

9. The apparatus of claim 8, wherein the peak in the rotated power curve represents and end of a downlink subframe, and wherein the processing device is configured to set the switch to uplink mode based on the end of the downlink subframe.

10. The apparatus of claim 8, wherein the processing device is configured to add a plurality of sampled frames by aligning a start of each of the plurality of sampled frames and summing the sampled frames to produce an average sampled frame;

wherein the processing device is configured to cumulatively sum the average sampled frame to produce the summed power curve.

11. The apparatus of claim 8, wherein the processing device is configured to cumulatively sum the sampled signal from a start of a frame to an end of a frame.

12. The apparatus of claim 8, wherein the processing device is configured to cumulatively sum samples of the sampled signal above a threshold and ignore samples of the sampled signal below the threshold.

13. The apparatus of claim 12, wherein the threshold is approximately a midpoint between ON and OFF samples of the sampled signal, wherein ON samples are sampled obtained while a subframe is being received and OFF samples are samples obtained while a subframe is not being received.

14. The apparatus of claim 8, wherein the reference line is half of a threshold value cumulatively added to itself, wherein the threshold value is approximately half of a midpoint between ON and OFF samples of the detected signal, wherein ON samples are sampled obtained while a subframe is being received and OFF samples are samples obtained while a subframe is not being received.

15. A communication system comprising:

at least one hub that is configured to communicate with a base station;

a plurality of remote antenna units communicatively coupled to the at least one hub and configured to communicatively couple signals between the at least one hub and a plurality of wireless terminals;

wherein the at least one hub further comprises:

a switch having a first port coupled to an uplink communication path and a second port coupled to a downlink communication path;

a power level detector configured to measure a power level of radio frequency signals propagating through the switch;

a processing device configured to cumulatively sum a sampled signal obtained by the power level detector to produce an summed power curve, wherein the processing device is configured to subtract a reference line from the summed power curve to obtain a rotated power curve, and wherein the processing device is configured to control the switch based on a time of a peak in the rotated power curve.

16. The system of claim 15, wherein the peak in the rotated power curve represents and end of a downlink subframe, and wherein the processing device is configured to set the switch to uplink mode based on the end of the downlink subframe.

17. The system of claim 15, wherein the processing device is configured to add a plurality of sampled frames by aligning a start of each of the plurality of sampled frames and summing the sampled frames to produce an average sampled frame;

wherein the processing device is configured to cumulatively sum the average sampled frame to produce the summed power curve.

18. The system of claim 15, wherein the processing device is configured to cumulatively sum samples of the sampled signal above a threshold and ignore samples of the sampled signal below the threshold.

19. The system of claim 15, wherein the threshold is approximately a midpoint between ON and OFF samples of the sampled signal, wherein ON samples are sampled obtained while a subframe is being received and OFF samples are samples obtained while a subframe is not being received.

20. The system of claim 15, wherein the reference line is half of a threshold value cumulatively added to itself, wherein the threshold value is approximately half of a midpoint between ON and OFF samples of the detected signal, wherein ON samples are sampled obtained while a subframe is being received and OFF samples are samples obtained while a subframe is not being received.

21. An apparatus for switching in a time division duplexing system comprising:
- an interface to communicatively couple the apparatus to a communication medium, wherein the apparatus is operable to switch between outputting first signals on the communication medium and receiving second signals from the communication medium in accordance with a time division duplexing scheme;
- a power level detector to output samples indicative of a power level of the first signals; and
- a processing device configured to cumulatively sum the samples output by the power level detector to produce an summed power curve, wherein the processing device is configured to subtract a reference line from the summed power curve to obtain a rotated power curve, and wherein the processing device is configured to control the switching between outputting first signals on the communication medium and receiving second signals from the communication medium based on a time of a peak in the rotated power curve.

22. The apparatus of claim 21, wherein the peak in the rotated power curve represents and end of a downlink subframe, and wherein the processing device is configured to control the switching based on the end of the downlink subframe.

23. The apparatus of claim 21, wherein the processing device is configured to add a plurality of sampled frames by aligning a start of each of the plurality of sampled frames and summing the sampled frames to produce an average sampled frame;
wherein the processing device is configured to cumulatively sum the average sampled frame to produce the summed power curve.

24. The apparatus of claim 21, wherein the processing device is configured to cumulatively sum the sampled signal from a start of a frame to an end of a frame.

25. The apparatus of claim 21, wherein the processing device is configured to cumulatively sum samples of the sampled signal above a threshold and ignore samples of the sampled signal below the threshold.

26. The apparatus of claim 25, wherein the threshold is approximately a midpoint between ON and OFF samples of the sampled signal, wherein ON samples are sampled obtained while a subframe is being received and OFF samples are samples obtained while a subframe is not being received.

27. The apparatus of claim 21, wherein the reference line is half of a threshold value cumulatively added to itself, wherein the threshold value is approximately half of a midpoint between ON and OFF samples of the detected signal, wherein ON samples are sampled obtained while a subframe is being received and OFF samples are samples obtained while a subframe is not being received.

* * * * *

UNITED STATES PATENT AND TRADEMARK OFFICE
CERTIFICATE OF CORRECTION

| | | |
|---|---|---|
| PATENT NO. | : 7,961,689 B2 | Page 1 of 1 |
| APPLICATION NO. | : 12/208971 | |
| DATED | : June 14, 2011 | |
| INVENTOR(S) | : Stratford | |

It is certified that error appears in the above-identified patent and that said Letters Patent is hereby corrected as shown below:

At Claim 7, Column 11, Line 37, replace "sampled obtained" with -- samples obtained --

At Claim 8, Column 11, Line 50, replace "an summed" with -- a summed --

At Claim 9, Column 11, Line 57, replace "and end" with -- an end --

At Claim 13, Column 12, Line 10, replace "samples are sampled" with -- samples are samples --

At Claim 14, Column 12, Line 17, replace "sampled obtained" with -- samples obtained --

At Claim 15, Column 12, Line 36, replace "an summed" with -- a summed --

At Claim 16, Column 12, Line 43, replace "and end" with -- an end --

At Claim 19, Column 12, Line 59, replace " samples are sampled" with -- samples are samples --

At Claim 20, Column 13, Line 1, replace "sampled" with -- samples --

At Claim 21, Column 13, Line 15, replace "produce an" with -- produce a --

At Claim 22, Column 13, Line 25, replace "and end" with -- an end --

At Claim 26, Column 14, Line 18, replace "samples are sampled" with -- samples are samples --

At Claim 27, Column 14, Line 25, replace "sampled" with -- samples --

Signed and Sealed this
Sixth Day of March, 2012

David J. Kappos
*Director of the United States Patent and Trademark Office*